HIGH FREQUENCY SIGNAL CONVERSION SYSTEM

Original Filed May 23, 1946 3 Sheets-Sheet 1

INVENTOR
Wendell L. Carlson
BY H. L. Mueller(?)
ATTORNEY

INVENTOR
Wendell L. Carlson
BY H. K. Newton
ATTORNEY

HIGH FREQUENCY SIGNAL CONVERSION SYSTEM

Original Filed May 23, 1946 3 Sheets-Sheet 3

INVENTOR
Wendell L. Carlson
BY H. G. Newton
ATTORNEY

United States Patent Office 2,706,775

Patented Apr. 19, 1955

2,706,775

HIGH FREQUENCY SIGNAL CONVERSION SYSTEM

Wendell L. Carlson, Princeton, N. J., assignor to Radio Corporation of America, a corporation of Delaware Original application May 23, 1946, Serial No. 671,698. Divided and this application June 21, 1951, Serial No. 232,771

5 Claims. (Cl. 250—20)

Figure 1:
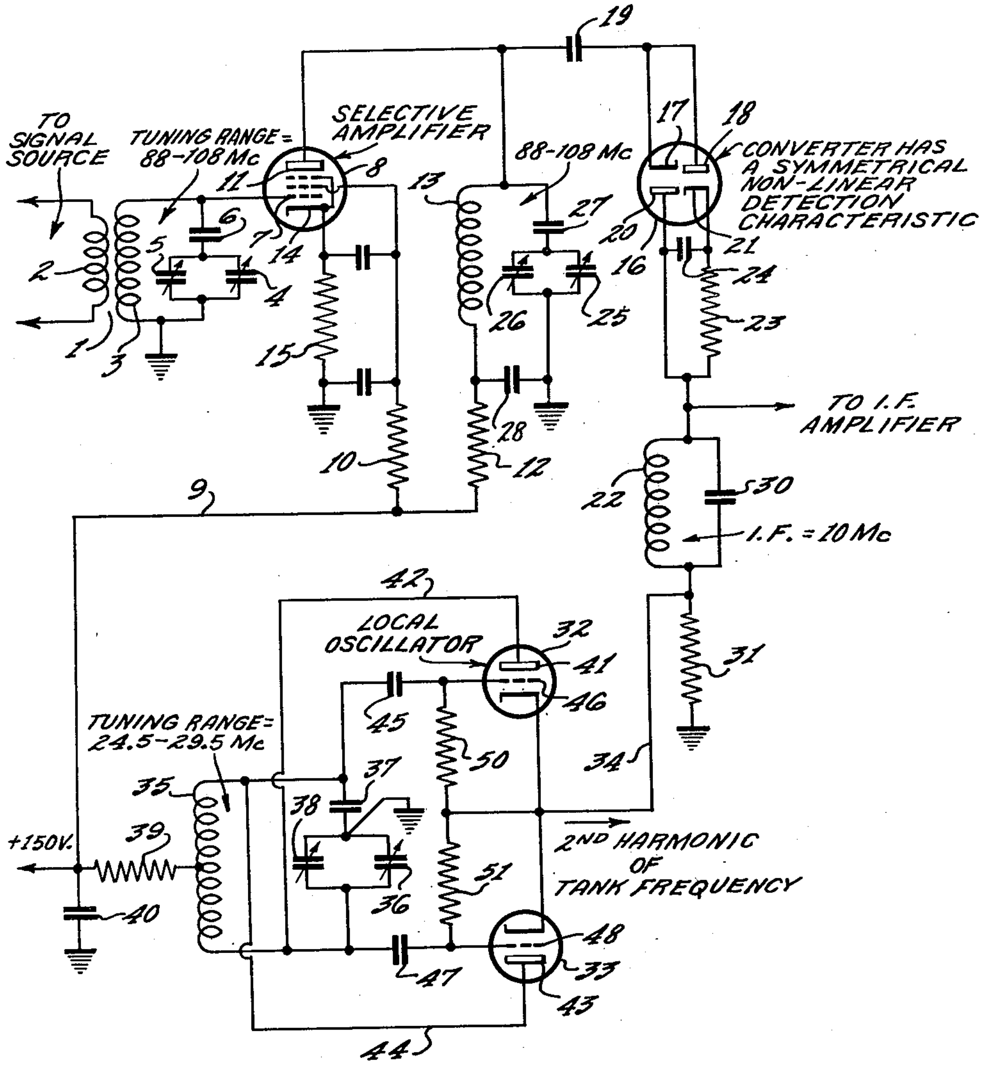

This invention relates to novel and improved signal selector circuits for a superheterodyne receiver operating in the high frequency ranges above, for example, 20 megacycles (mc.), and more particularly to improved local oscillator and mixer circuits for such a receiver.

This application is a division of my original application filed on May 23, 1946, Serial No. 671,698, now abandoned, and assigned to the assignee of the present application.

Present frequency allocations for frequency modulation (FM) broadcasting (88–108 mc.) and television create new problems for the designer of the receiver, especially in the networks preceding the intermediate frequency (I. F.) amplifier. It is well known that as the frequency of an oscillator suitable for use in a broadcast receiver is increased above 20 mc., for example, the percent frequency stability decreases quite rapidly. This decrease in frequency stability is largely due to the distribution of a large part of the inductance and capacity components of the resonant circuit in the wiring, switches, tube socket and tube elements etc., all of which are less easily stabilized than are lumped constants.

It is an important object of my present invention to improve the frequency stability of a local oscillator of a superheterodyne receiver operating to receive higher frequency signals well above 20 mc., by operating the oscillator at a sub-harmonic frequency and at the same time to avoid undesired extra heterodyne responses.

Another important object of my invention is to provide a diode mixer circuit having a symmetrical non-linear detection characteristic, the mixer being not efficiently responsive to combinations of fundamental, third or fifth local oscillator harmonic operation.

Another object of my invention is to provide a local oscillator and heterodyne converter circuit which allows one-fourth the usual oscillator frequency to be employed thereby to improve greatly oscillator frequency stability, the usual difficulties from spurious frequency responses being avoided.

A further object of my invention is to provide a local oscillator circuit for a superheterodyne receiver, wherein the local oscillator consists of a push-pull double triode circuit having a tank circuit tuned to a frequency which is one-half of the local oscillator frequency ultimately delivered in the mixer circuit.

A more specific object of the invention is to provide a frequency conversion network which comprises a pair of diodes connected in opposed relation ot a source of high frequency signals, a local oscillator feeding into the conversion network the second harmonic frequency of the oscillator tank frequency.

The invention has two objectives; to improve frequency stability and to reduce radiation from the local oscillator; these objectives to be accomplished without introducing objectional spurious responses.

Still other features and objects of my invention will best be understood by reference to the following description, taken in connection with the drawing, in which I have indicated diagrammatically several circuit organizations whereby my invention may be carried into effect.

In the drawings:

Fig. 1 shows a portion of a superheterodyne receiver embodying the invention; and Figs. 2*a* to 2*d* inclusive illustrate the operation of the invention.

Referring now to Fig. 1, it is first pointed out that the local oscillator and converter circuits shown therein may be embodied in any very high frequency receiver which is of the superheterodyne type. I wish it clearly understood that my invention is not limited to AM, FM or television reception, since the circuits described are adapted for receiving signals in frequency ranges substantially above 20 mc. Merely by way of example, it is assumed that the signal collector is a dipole (not shown) which is set up to collect signals in the presently assigned FM broadcast range of 88–108 mc.

One stage of selective high frequency amplification is provided between the source of signals and the converter input circuit. Thus, numeral 1 denotes an input transformer whose primary winding 2 is connected to the signal collecting device, while the secondary winding 3 has its terminals shunted by a tuning condenser 4 to provide selective tuning over the range of 88–108 mc. The shunt series padding condensers 5 and 6 respectively are electrically connected to the tuning condenser, and the control grid 7 of amplifier tube 8 is connected to the ungrounded high potential side of the secondary winding 3. The amplifier tube 8 may be of any suitable type, such as a 6AK5. The +150 volts direct current voltage point of the power supply system is connected by lead 9 to the screen grid of amplifier tube 8 through resistor 10, and to the plate 11 of the amplifier tube through a series path including resistor 12 and the winding 13 of the resonant input circuit of the converter network. The cathode 14 of amplifier tube 8 is connected to ground through the biasing resistor 15, and the upper and lower ends of the biasing resistor are bypassed to the screen circuit lead through suitable high frequency bypass condensers.

The converter or mixer circuit includes a double diode tube 16, which may be of the 6AL5 type, but it is to be clearly understood that any other type of double diode tube may be employed. The diodes may, of course, be separate tubes. The electrodes of the pair of diodes are connected so that the devices are in electrically opposed relation. Thus, the cathode 17 and anode 18 of the respective diodes are connected in common through high frequency coupling condenser 19 to the high potential end of coil 13. The anode 20 and the cathode 21 of the respective diodes are connected in common to the high potential end of the coil 22 of the I. F. output circuit of the converter network. The lead from diode cathode 21 includes resistor 23, and high frequency bypass condenser 24 is connected directly between anode 20 and cathode 21.

The coupling condenser 19 prevents the flow of direct current therethrough. Accordingly, the only return path of the direct currents flowing through rectifiers 17, 20 and 18, 21 is through the resistor 23. The resistor 23, in combination with the condenser 24, functions as a means for raising and self-equalizing the impedances of the two rectifiers 17, 20 and 18, 21. The condenser 24 functions as a self-equalizing means because it allows each rectifier to act as the grid leak for the other rectifier. The impedance of the two rectifiers is raised by means of the resistor 23. For the proper operation of the system of the present invention it is important that the detection characteristic is symmetrical. The provision of the self-equalizing means 23, 24 permits a more symmetrical detection characteristic. Only if the detection characteristic is symmetrical can the oscillatory energy of undesired frequencies be made ineffective by cancellation as will be more fully explained hereinafter.

The coil 13 of the resonant input circuit of the opposed diodes is shunted by the tuning condenser 25, which is connected in circuit with the respective shunt and series padding condensers 26 and 27. The lower end of coil 13 is connected to the grounded end of the tuning condenser 25 through the high frequency bypass condenser 28. Any suitable mechanical coupling means may be employed for conjointly varying the capacities of tuning condensers 4 and 25 so that the resonant input and output circuits of amplifier tube 8 are concurrently adjusted to common carrier frequencies of the 88–108 mc. tuning range.

The resonant output circuit of the diode converter circuit, as stated before, includes the coil 22, and the coil is shunted by condenser 30 thereby tuning the coil 22 to the operating I. F. value of say 10 mc. The low potential side of I. F. circuit 22, 30 is connected to ground through resistor 31, and the I. F. output energy is taken off from the high potential side of I. F. circuit 22, 30 for utilization in the subsequent I. F. amplifier network. It is pointed out that the converter circuit thus far described has a symmetrical non-linear detection characteristic. Instead of the pair of diodes connected back to back, a pair of crystal detectors may be utilized. The converter characteristic requires that the local oscillator employed be operated at one half of the normal oscillation frequency. For example, let us assume that a signal of 100 mc. has been tuned in. The normal local oscillator frequency to produce an I. F. of 10 mc. would be 90 or 110 mc. For the present converter the required local oscillator frequency would then be 45 or 55 mc. Frequencies of 90 or 110 mc. combining with the 100 mc. signal in the present system would produce substantially no I. F. output as will be shown hereinafter.

Accordingly, I have provided in Fig. 1 a local oscillator circuit which not only functions to develop in the converter circuit a local oscillation which is one half normal frequency, but the local oscillator circuit itself utilizes a tank circuit which is tuned to a fundamental frequency which is one half that required at the converter circuit, or one fourth normal frequency. Hence, all the advantages of a lower frequency oscillator, such as stability, ease of maintenance condition, etc., are achieved.

The local oscillator circuit shown utilizes a pair of triodes arranged in push-pull relation. The triodes may be provided by a 6J6 tube, but any other suitable tube or tubes may be used. Assuming that triode tubes 32 and 33 are in separate tube envelopes, the cathodes thereof are connected in common to lead 34 which is connected to the upper end of resistor 31. Lead 34, therefore, is the path over which the local oscillator energy is injected into the converter circuit. The tank circuit of the local oscillator consists of coil 35 shunted by tuning condenser 36. The lower end of coil 35 is connected to the ungrounded terminal of condenser 36, while the opposite end of coil 35 is connected through the series padding condenser 37 to the grounded terminal of tuning condenser 36. Condenser 38 shunts condenser 36, and functions as the second padding condenser. The midpoint of coil 35 is connected over resistor 39 to the positive voltage supply lead 9, condenser 40 bypassing the lead 9 to ground.

The plate 41 of oscillator tube 32 is connected by lead 42 to the lower end of coil 35, while the plate 43 of oscillator tube 33 is connected by lead 44 to the upper end of coil 35. The upper end of coil 35 is coupled through condenser 45 to the control grid 46, while the condenser 47 connects the lower end of coil 35 to the control grid 48. Each control grid is returned to the common cathode lead of the oscillator tubes through repective suitable grid leak resistors 50 and 51.

It is to be clearly understood that the tuning condenser 36 may be concurrently adjusted with condensers 4 and 25 by any suitable mechanical control device. Those skilled in the art are fully aware of the manner of adjusting the capacities of the respective series and shunt condensers of the tuning condensers 4, 25 and 36 so that with the tank circuit having a tuning range of 24.5 to 29.5 mc., the tank circuit will track with the 88 to 108 mc. tuning ranges of the respective signal selector circuits of the amplifier and converter. With suitable tracking adjustment the converted signal energy produced across output circuit 22, 30 will have a frequency of 10 mc.

Furthermore, those skilled in the art of radio communication are aware of the fact that the resonant input circuits of the amplifier tube 8 and converter tube 16, as well as I. F. output circuit 22, 30 should have passband widths sufficient to transmit the maximum signal swing of the FM signals. In other words, the signal transmission circuits should be wide enough to pass a frequency band at least 150 kc. wide. In the case of television signals the band width would depend on the particular band of video frequencies employed. Of course, in the case of AM reception the signal selector circuits would have band widths dependent upon the audio modulation band employed to modulate the carrier. In any case, my invention is independent of the response curves employed at the successive signal selector circuits associated with amplifier tube 8 and converter tube 16.

Figure 2A:
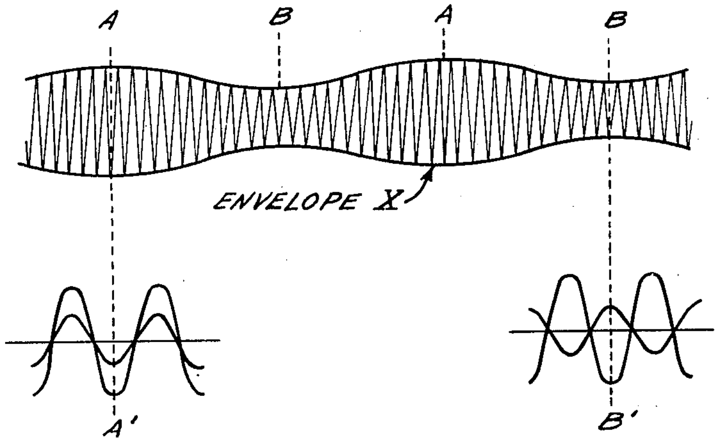
Fig. 2a. PRIOR ART
Figure 2B:
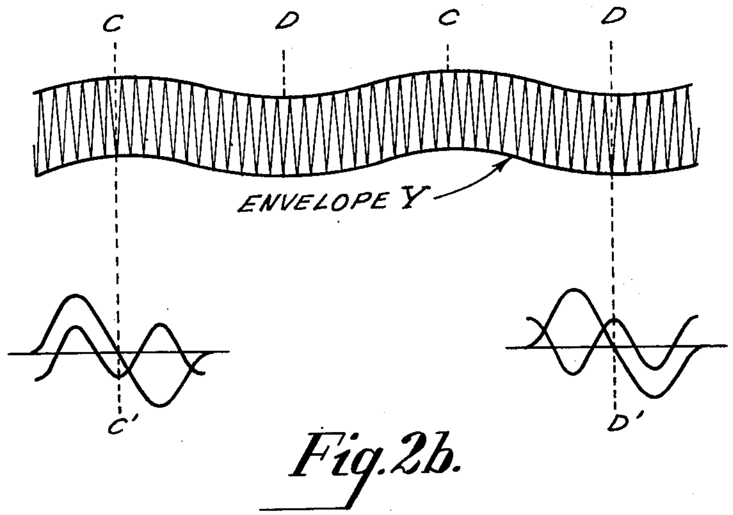
Figure 2C:
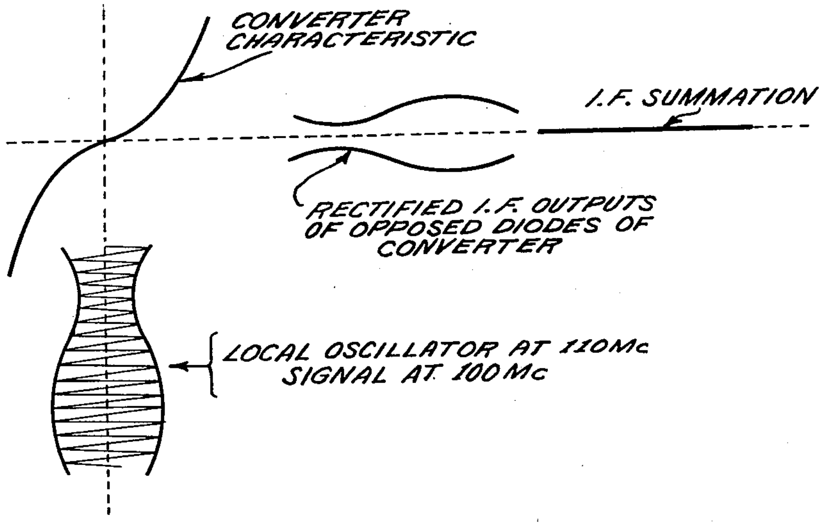
Figure 2D:
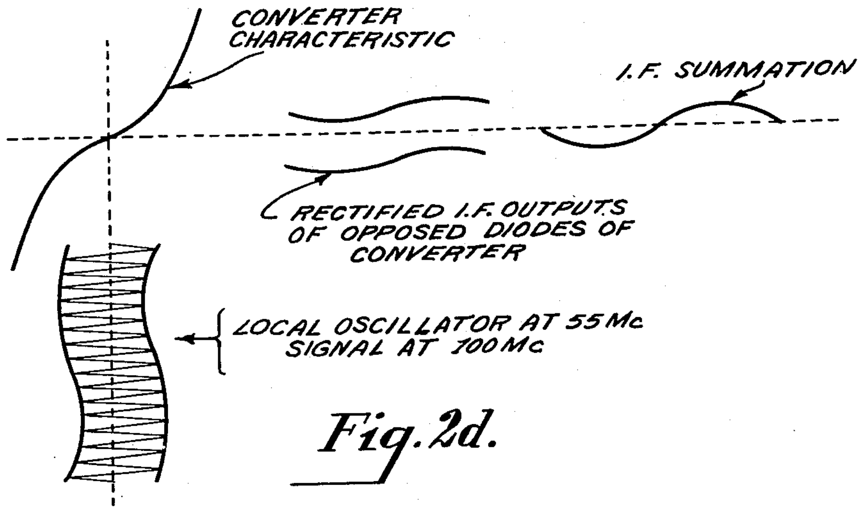

For a physical conception of the converter operation, reference is first made to envelopes of the combined signal and local oscillator voltages as represented in Fig. 2*a*. Combining frequencies of 110 mc. and 100 mc. with amplitude ratios of say 2 to 1 will give the I. F. wave form as shown by envelope X. The phase relation of the component radio frequencies are sampled at A and B of envelope X, and represented in expanded form by respective curves A′ and B′. This is the usual heterodyne wave form involved in the conventional superheterodyne receiver. Now, assume that a local oscillator of 55 mc. is combined with the signal of 100 mc. The I. F. wave form will be as in envelope Y of Fig. 2*b*, and the sample sections taken at C and D of the wave will have the radio frequency phase relations shown in respective curves C′ and D′. Figure 2*c* illustrates the case of the 110 mc. local oscillator frequency beating with the 100 mc. signal when applied to the symmetrical non-linear detector. The rectified I. F. from each detector is equal and opposite, which when combined, form an I. F. potential of zero. Fig. 2*d* illustrates the case of the 55 mc. local oscillator output frequency beating with the 100 mc. signal when applied to the symmetrical non-linear detector. The summation of the currents from the two diodes combine to produce an I. F. potential as shown.

This circuit is particularly well adapted for applications where radiation from the local oscillator into the antenna circuit must be held down to a low value. Assume that the antenna signal feeds directly to the converter input circuit. If a 100 mc. signal frequency is being received, there will be required a 55 mc. local oscillator frequency. A third harmonic frequency, 165 mc., will also be present in the converter circuit, but substantially no second harmonic frequency 110 mc. will be present. The attenuation of the input circuits that are resonant to 100 mc. will be much greater for 55 mc. and 165 mc. than for 110 mc.

Another advantage of this circuit is improved oscillator stability due to operating the local oscillator at one half the normal required frequency. Experience has shown that the percent frequency drift usually becomes greater as the frequency of operation is increased. The extra responses are generally a serious disadvantage when operating a conventional converter with half normal local oscillator frequency. Under these conditions, undesired signals of say 65 or 155 mc. beat with the oscillator fundamental or third oscillator harmonics to produce I. F. signals. Not so in this case, provided the characteristic present at the converter is symmetrical. Note that both the R. M. S. and peak potentials vary over the I. F. cycle in the wave envelope X of Fig. 2*a*, while only the peak potentials of wave envelope Y vary over the I. F. cycle. The R. M. S. value in wave envelope Y of Fig. 2*b* is constant over the I. F. cycle.

Considering, now, the harmonic oscillator as shown in Fig. 1, a double triode tube (6J6) is used in push-pull arrangement with a common impedance 31 whereby for each half cycle, current flows through the common impedance. This produces a frequency across the common impedance which is double that in the tank circuit. In some cases it may be desirable to use an inductance for this common impedance, this being mutually coupled to another broadly tuned circuit. If desired, lead 34 may be a tap on coil 22, and resistance 31 omitted. In the actual receiver described, a resistor 31 of 150 ohms is used. It is possible to obtain second harmonic voltages which are about 30 times greater than that produced at the fundamental frequency.

As was pointed out above, a converter was employed which required half normal local oscillator frequency. To take some numbers let us consider the FM band of 88–108 mc. If the I. F. is to be 10 mc., and the oscillator is to be above the carrier, the oscillator band for the conventional superheterodyne receiver would be 98 to 118 mc. With the symmetrical non-linear detector the desired frequency to be injected at the converter is 49–59 mc. With the harmonic oscillator described above the 49–59 mc. frequency is to be generated across the impedance 31, and in order to generate this frequency the tank oscillating frequency is in the band of 24.5 to 29.5 mc. Therefore, the fundamental frequency of the oscillator is one fourth that required in the conventional system, and all the advantages of a lower frequency oscillator, such as stability, ease of maintenance condition, etc. are achieved. It is interesting to note that the local oscillator voltages in the range of 98–118 mc. do not really exist, and are useful only in considering the operation of the converter.

With the use of a harmonic oscillator, one must consider the magnitude and frequency of spurious, or unwanted, responses. The present described system is superior in this respect, because both the oscillator and converter are designed to eliminate or reduce such responses. The push-pull oscillator supplies to the converter the second harmonic frequency with the fundamental attenuated. At the same time the converter, by reason of its design, requires a half frequency for its proper operation. It should be evident that the local oscillator radiation is lower than with the conventional system. No part of the signal circuit is resonant near the oscillator fundamental or second harmonic frequency. This feature would become more important if the high frequency amplifier stage were omitted.

What is claimed is:

1. In a frequency conversion network, a first and a second non-linear rectifier, each having a cathode and an anode, a circuit comprising a resistor and a capacitor connected between the anode of said first rectifier and the cathode of said second rectifier for increasing and self-equalizing the impedances of said rectifiers, the cathode of said first rectifier and the anode of said second rectifier being connected together at a common point, a source of radio frequency signals, a source of local oscillations developing a wave having a constant frequency lower than that of said radio frequency signals, and an output circuit responsive to an intermediate frequency corresponding to the difference between the frequency of said signals and twice the frequency of said wave, said sources and said output circuit being connected in series with said common point and said circuit comprising a resistor and a capacitor connected with said rectifiers for increasing and self-equalizing said impedances.

2. In a frequency conversion network, a first and a second rectifier, each having a cathode and an anode, a capacitor and a resistor common to both of said rectifiers and coupling the anode of said first rectifier to the cathode of said second rectifier, thereby increasing and self-equalizing the impedances of said rectifiers, means providing a source of radio frequency signals, a source of local oscillations developing a wave having a constant frequency lower than that of said radio frequency signals, and means providing an output circuit tuned to an intermediate frequency corresponding to the difference between the frequency of said signals and twice the frequency of said wave, means serially connecting said sources and said output circuit with each of said rectifiers, the cathode of said first rectifier being connected to the anode of said second rectifier.

3. In a frequency conversion network, a pair of parallel rectifiers, each having a cathode and an anode connected in opposed relationship, a circuit coupled to said rectifiers and including a resistor and capacitor connected in parallel between the anode of one of said rectifiers and the cathode of the other one of said rectifiers for increasing and self-equalizing the impedances of said rectifiers, means providing a source of radio frequency signals, means providing a source of local oscillation energy developing a wave of constant frequency lower than that of said radio frequency signals, and an output circuit responsive to an intermediate frequency corresponding to the difference between the frequency of said signals and twice the frequency of said constant frequency wave, means serially connecting said sources and said output circuit with said opposed rectifiers.

4. In a frequency conversion network, a pair of non-linear rectifiers, each having electrodes including an anode and a cathode, one cathode and one anode of the respective rectifiers being connected together at a common point so that the rectifiers are in electrically opposed relationship, a circuit for increasing and self-equalizing the impedances of said rectifiers and comprising a resistor and a first capacitor connected in parallel between the other cathode and anode, a source of radio frequency signals, a second capacitor coupling said source to said common point of said rectifiers, a local oscillator coupled to said rectifiers and impressing on the rectifiers a wave of constant frequency and equal to one half the frequency of a wave displaced in frequency from the frequency of said signals by an amount equal to the desired intermediate frequency, and an output circuit coupled serially to said circuit for increasing and self-equalizing the impedance of said rectifiers, said output circuit being responsive to an intermediate frequency corresponding to the difference between the frequency of said signals and twice the frequency of said constant frequency wave.

5. In a frequency conversion system, a pair of non-linear rectifiers, each having a cathode and an anode, the cathode of one of the rectifiers being connected to the anode of the other rectifier at a common point so that the rectifiers are in electrically opposed relationship, a resistor and a first capacitor connected in parallel between the other cathode and anode of said rectifiers for increasing and self-equalizing their impedances, a source of radio frequency signals having two terminals, a second coupling capacitor coupling one of said terminals to said common point of said rectifiers, a local oscillator and an output circuit connected serially between the other one of said terminals and said first capacitor and resistor, said local oscillator impressing on the rectifiers a wave of constant frequency lower than that of said radio frequency signals, said output circuit being responsive to an intermediate frequency corresponding to the difference between the frequency of said signals and twice the frequency of said constant frequency wave, whereby the direct current flowing through said rectifiers will also flow through said resistor.

References Cited in the file of this patent

UNITED STATES PATENTS

| | | |
|---|---|---|
| 1,793,959 | Powell | Feb. 24, 1931 |
| 1,997,012 | Peterson | Apr. 9, 1935 |
| 2,088,432 | Peterson | July 27, 1937 |
| 2,286,378 | Roberts | June 16, 1942 |
| 2,296,107 | Kimball | Sept. 15, 1942 |
| 2,545,232 | Hings | Mar. 13, 1951 |
| 2,608,650 | Myers | Aug. 26, 1952 |
| 2,621,291 | Hings | Dec. 9, 1952 |